United States Patent
Ansari

(10) Patent No.: US 10,009,461 B2
(45) Date of Patent: Jun. 26, 2018

(54) DYNAMIC USER INTERFACE TO REDUCE IMPACT OF UNWANTED CALLS

(71) Applicant: Sadiq Aziz Ansari, Mclean, VA (US)

(72) Inventor: Sadiq Aziz Ansari, Mclean, VA (US)

( * ) Notice: Subject to any disclaimer, the term of this patent is extended or adjusted under 35 U.S.C. 154(b) by 94 days.

(21) Appl. No.: 15/181,378

(22) Filed: Jun. 13, 2016

(65) Prior Publication Data
US 2016/0360036 A1 Dec. 8, 2016

Related U.S. Application Data

(60) Provisional application No. 62/172,623, filed on Jun. 8, 2015.

(51) Int. Cl.
*H04M 3/436* (2006.01)
*H04M 3/42* (2006.01)
*H04M 1/725* (2006.01)
*H04M 1/57* (2006.01)
*H04M 1/663* (2006.01)

(52) U.S. Cl.
CPC ............ *H04M 3/436* (2013.01); *H04M 1/57* (2013.01); *H04M 1/663* (2013.01); *H04M 1/72583* (2013.01); *H04M 3/42042* (2013.01); *H04M 1/575* (2013.01); *H04M 2201/18* (2013.01); *H04M 2201/38* (2013.01); *H04M 2203/551* (2013.01)

(58) Field of Classification Search
CPC ........ H04M 3/436; H04M 1/633; H04M 1/57; H04M 1/72583; H04M 3/42042; H04M 2208/551; H04M 2201/18; H04M 2201/38; H04M 1/575
See application file for complete search history.

(56) References Cited

U.S. PATENT DOCUMENTS

| | | | |
|---|---|---|---|
| 8,094,800 B1 * | 1/2012 | Smith | H04M 3/436 379/210.02 |
| 2006/0015561 A1 * | 1/2006 | Murphy | G06Q 10/107 709/206 |
| 2014/0128047 A1 * | 5/2014 | Edwards | H04L 51/12 455/415 |
| 2015/0156300 A1 * | 6/2015 | Park | H04M 1/663 455/414.1 |

OTHER PUBLICATIONS

Mr. Number—Block Calls & Spam, https://play.google.com/store/apps/details?id=com.mrnumber.blocker&hl=en, Whitepages Inc. (visited Jan. 26, 2015).
Who Called Me?, http://who-calldme.com (visited Mar. 15, 2015).
WhoCallsMe: Reverse Phone Directory, http://whocallsme.com (visited Mar. 15, 2015).
Who Called Me—Find Out Who Called Me, http://www.whocalledme.com (visited Mar. 15, 2015).

* cited by examiner

*Primary Examiner* — Maros Torres
(74) *Attorney, Agent, or Firm* — Sadiq Aziz Ansari

(57) ABSTRACT

A user device (e.g., a mobile phone) may receive unwanted calls on a regular enough basis to irritate a user of the user device. Systems and/or methods, described herein, may identify unwanted calls in an automated fashion, and may allow users to quickly make intelligent decisions as to whether they should answer an incoming call from an unknown number or not. Potentially unwanted calls may be blocked entirely, to further enhance users' experiences. The determination of whether a caller is an unwanted caller may be refined in an ongoing process, in order to ensure that calls are being properly blocked or allowed.

20 Claims, 8 Drawing Sheets

DYNAMIC USER INTERFACE TO REDUCE IMPACT OF UNWANTED CALLS

CROSS-REFERENCE TO RELATED APPLICATION

This application claims the benefit of U.S. Provisional Patent Application No. 62/172,623, titled "DYNAMIC USER INTERFACE TO REDUCE IMPACT OF UNWANTED CALLS," filed Jun. 8, 2015, the contents of which are incorporated herein by reference.

BACKGROUND

Telemarketers, spammers, and scammers often contact individuals by telephone, which may lead to the annoyance of such individuals. The national "Do Not Call" registry is a mechanism by which individuals can opt out of unsolicited telephone calls. However, unscrupulous telemarketers, spammers, and scammers may ignore the Do Not Call registry, and may call individuals anyway. Another available option includes manually blocking phone numbers of unwanted callers on a number by number basis. This option can be tedious, and would not prevent unwanted calls from numbers which have not been identified and blocked beforehand.

DETAILED DESCRIPTION OF PREFERRED EMBODIMENTS

The following detailed description refers to the accompanying drawings. The same reference numbers in different drawings may identify the same or similar elements.

Some implementations, describe herein, may provide an enhanced user interface on a user device (e.g., a mobile telephone) when a call is received from a potentially unwanted caller. An "unwanted caller," as referred to herein, may include a telemarketer, a spammer, a scammer, and/or some other type of caller who may generally be undesirable to talk to.

Figure 1:
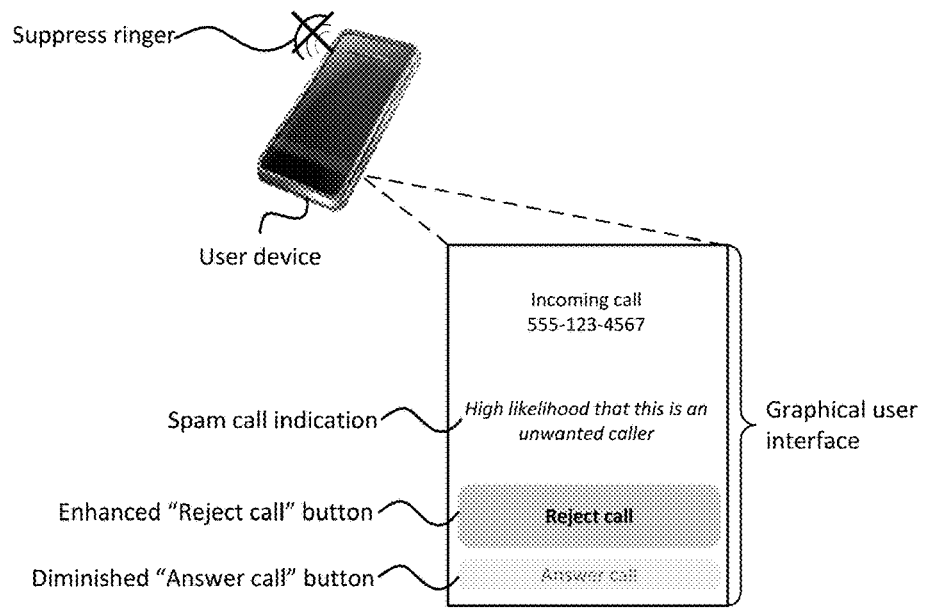
FIG. 1 illustrates an example overview of implementations described herein, in which a user interface may indicate, in an enhanced manner, that an incoming call may be from an unwanted caller.

As shown in FIG. 1, a user device may receive an incoming call from a caller with the telephone number "555-123-4567." The user device may notify a user that an incoming call is being received, such as by presenting a graphical user interface, playing a voice notification, and/or providing haptic feedback (e.g., vibrating). As shown, the graphical user interface may indicate that an incoming call is being received, and may visually indicate the telephone number associated with the call. As further shown, and in accordance with some implementations, the graphical user interface may indicate that the incoming call is (or may be) a "spam call" (e.g., a call from an unwanted caller). For instance, the graphical user interface may include a spam call indication, such as the text "High likelihood that this is an unwanted caller."

Additionally, or alternatively, the graphical user interface may include modified answer/reject call buttons (e.g., modified with respect to call buttons that are ordinarily presented, such as when a call comes in from a caller who is not an unwanted caller, such as a caller on the user's contact list). For example, the graphical user interface may present an enhanced "Reject call" button (e.g., a larger reject call button than normal; a button with more prominent shading or text, such as a different color or larger or bolded typeface; and/or a button that is generally more prominent than a "Reject call" button that is ordinarily presented). Furthermore, the graphical user interface may present a diminished "Answer call" button (e.g., a smaller button than normal; a button with less prominent shading or text, such as a different color or smaller or "greyed out" typeface; and/or a button that is generally more prominent than a "Reject call" button that is ordinarily presented).

In some implementations, when an incoming call from a potentially unwanted caller is received, a ringtone may be suppressed or otherwise modified. For example, a present ringtone setting may be overridden when a call from a potentially unwanted caller is received. The ring may, in some implementations, be presented at a lower volume, may be muted, and/or may vibrate in lieu of ringing. In some implementations, a vibration setting may be modified for calls from unwanted callers. For example, if the phone is set to "vibrate," the phone may not vibrate or ring when a call from a potentially unwanted caller is received. As yet another example, in accordance with some implementations, a particular ringtone and/or vibration pattern may be used when a call from a potentially unwanted caller is received.

While a user may manually set up a "block" list (e.g., by manually inputting telephone numbers that correspond to unwanted callers, or by choosing a "block this number" option after an unwanted call has been received), such a block list may not be useful in preventing the user from being disturbed by calls from callers he or she has not been called by before. However, other users in the past may have already been disturbed by such unwanted callers, and may have provided information (e.g., telephone numbers) associated with the unwanted calls (e.g., to a publicly available website, on which complaints can be registered).

Figure 2:
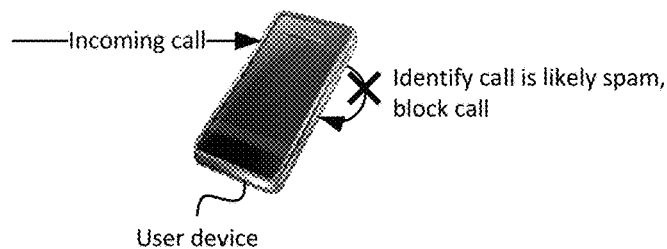
FIG. 2 illustrates an example overview of implementations described herein, in which a call, from a potentially unwanted caller, may be automatically blocked.

As shown in FIG. 2, in accordance with some implementations, an incoming call from a potentially unwanted caller may be automatically blocked. That is, for instance, a visual, haptic, and/or audible notification (e.g., a graphical user interface, a vibration, and/or a ring, respectively) may not be presented to the user when the call is received. In some implementations, a record of the call may not be kept by the user device, so that the user does not receive a "missed call" notification. In other implementations, and as described below, the user may be later notified that the call was blocked, so that the user can provide feedback regarding whether the caller is actually an unwanted caller or not, and/or may be afforded the opportunity to call the caller back.

By providing enhanced visual, haptic, and/or audible call notifications for potentially unwanted calls, some implementations may improve the experience of the user, by minimizing the irritation that can be caused by harassment from spammers, scammers, telemarketers, debt collectors, or other unsavory individuals (e.g., individuals from whom a user may not wish to speak). Further, blocking these calls entirely may also enhance the user experience. Providing the user an opportunity to view calls that have been blocked, and provide feedback, may help refine the determination of whether a caller is an unwanted caller or not.

In some implementations, a manufacturer and/or vendor of a user device may provide an application programming interface ("API"), via which a third party (such as a third party application ("app") developer) may modify or enhance a call notification screen. In some implementations, the API may be provided by an entity that creates or distributes an operating system, firmware, and/or read-only memory ("ROM") software for a user device. In some implementations, an operating system, firmware, and/or ROM may be modified (e.g., by a third party other than a manufacturer or vendor of the user device, and/or other than an entity that creates or distributes the operating system, firmware, and/or ROM), in order for an enhanced call notification, in accordance with some implementations, to be presented on the user device. In some implementations, a manufacturer of a user device, and/or a developer of an operating system, firmware, and/or ROM, may provide an enhanced call notification screen, in accordance with some implementations (e.g., a call notification screen that indicates whether a caller is an unwanted caller, and/or other concepts described herein).

Figure 3:
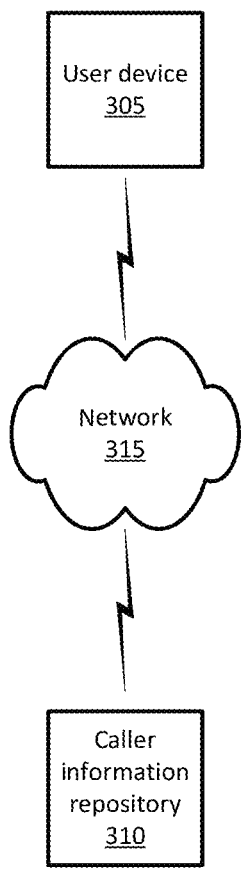
FIG. 3 illustrates an example environment, in which systems and/or methods, described herein, may be implemented.

FIG. 3 illustrates an example environment 300, in which systems and/or methods described herein may be implemented. As shown in FIG. 3, environment 300 may include user device 305, caller information repository 310, and wireless network 315.

The quantity of devices and/or networks, illustrated in FIG. 3, is provided for explanatory purposes only. In practice, environment 300 may include additional devices and/or networks; fewer devices and/or networks; different devices and/or networks; or differently arranged devices and/or networks than illustrated in FIG. 3. For example, while not shown, environment 300 may include devices that facilitate or enable communication between various components shown in environment 300, such as routers, modems, gateways, switches, hubs, etc. Alternatively, or additionally, one or more of the devices of environment 300 may perform one or more functions described as being performed by another one or more of the devices of environments 300. Devices of environment 300 may interconnect with each other and/or other devices via wired connections, wireless connections, or a combination of wired and wireless connections. In some implementations, one or more devices of environment 300 may be physically integrated in, and/or may be physically attached to, one or more other devices of environment 300.

User device 305 may include any computation and communication device that is capable of communicating with one or more networks (e.g., network 315). For example, user device 305 may include a radiotelephone, a personal communications system ("PCS") terminal (e.g., a device that combines a cellular radiotelephone with data processing and data communications capabilities), a personal digital assistant ("PDA") (e.g., a device that includes a radiotelephone, a pager, Internet/intranet access, etc.), a smart phone, a laptop computer, a tablet computer, a camera, a television, a set-top device ("STD"), a personal gaming system, a wearable device, and/or another type of computation and communication device. User device 305 may communicate with other devices, such as one or more other user devices 305, via network 315. User device 305 may include hardware circuitry and/or software logic that enable user device 305 to receive calls, such as telephone calls. The telephone calls may be received via voice call protocols associated with a wireless network (e.g., a cellular network), Voice over Internet Protocol ("VoIP"), Voice over Long-Term Evolution ("VoLTE"), and/or one or more other suitable techniques. In some implementations, the telephone calls may be voice calls, video calls, or the like.

Caller information repository 310 may include one or more devices (e.g., a server device or a collection of server devices) that store information regarding callers. For instance, the information, stored by caller information repository 310, may be used to determine whether a caller is an unwanted caller. Caller information repository 310 may store, for example, information regarding whether a caller was identified as an unwanted caller (e.g., based on user feedback from users of one or more user devices 305), a quantity of times that a caller was identified as an unwanted caller, a quantity of times that a caller was not identified as an unwanted caller, timestamps of calls from callers, and/or other information. In some implementations, caller information repository 310 may store a score for each caller, which may be used to determine whether a caller is an unwanted caller. For example, the score may be on a scale of 0-100, where a score of 0 indicates a minimal likelihood that a caller is an unwanted caller, and a score of 100 indicates with certainty (or near certainty) that a caller is an unwanted caller.

In some implementations, caller information repository 310 may be a publicly available and/or a third party web server (such as a web server that hosts web site), on which information (e.g., telephone numbers, indications of particular callers/telephone numbers that are associated with spam, etc.) regarding callers is available, and/or may receive information from such a third party web server. In some implementations, caller information repository 310 may include one or more proprietary information sources (e.g., a database owned and/or operated by an owner and/or operator of network 315 or a spam-blocking application or service). While one caller information repository 310 is shown in FIG. 3, in practice, multiple caller information repositories 310 may be used in accordance with some implementations.

Network 315 may include one or more networks, via which one or more devices, shown in FIG. 3, may communicate. For example, wireless network 315 may include an evolved packet system ("EPS") that includes an LTE network and/or an evolved packet core ("EPC") network that operate based on a Third Generation Partnership Project ("3GPP") wireless communication standard. The LTE network may be, or may include, a radio access network ("RAN") that includes one or more base stations, some or all of which may take the form of an eNodeB ("eNB"), via which user device 305 and/or another device may communicate with the EPC network. The EPC network may include one or more serving gateways ("SGWs"), mobility management entities ("MMEs"), and/or packet data network ("PDN") gateways ("PGWs"), and may enable user device 305 to communicate with PDN 220 and/or an IP Multimedia Subsystem ("IMS") core network. The IMS core network may manage authentication, session initiation, account information, a user profile, etc. associated with user device 305.

Network 315 may include one or more wireless networks in addition to, or in lieu of, an LTE network. For example, network 315 may include a Code Division Multiple Access ("CDMA") 3000 1× network, a second generation ("2G") wireless network, a third generation ("3G") wireless network, a fourth generation ("4G") wireless network, a fifth generation ("5G") wireless network, a "Wi-Fi" wireless network (e.g., a network that operates according to an Institute of Electrical and Electronics Engineers ("IEEE") 802.11-based standard), and/or another wireless network. Additionally, or alternatively, network 315 may include a packet data network ("PDN"), such as the Internet, a metropolitan area network ("MAN"), a wide area network ("WAN"), a private enterprise network, etc.

Figure 4:
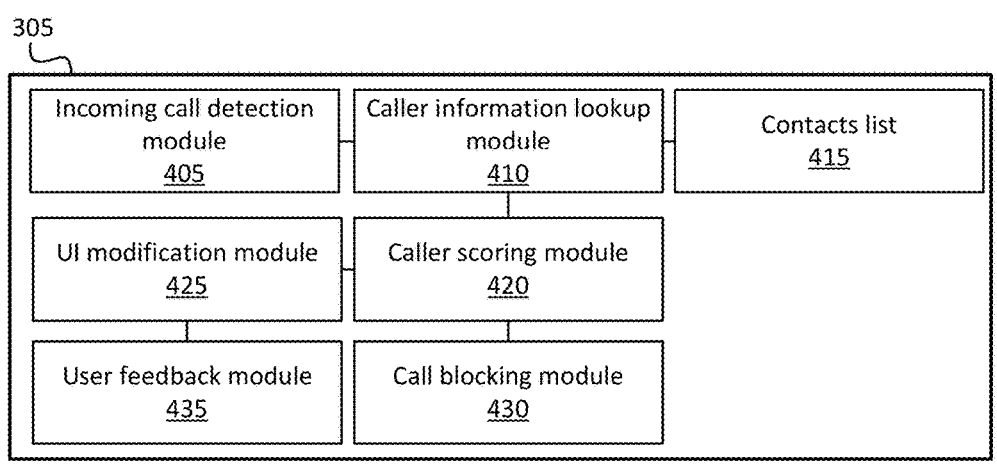
FIG. 4 illustrates example functional components of a user device, in accordance with some implementations.

FIG. 4 illustrates example functional components of user device 305, in accordance with some implementations. For instance, as shown, user device 305 may include incoming call detection module 405, caller information lookup module 410, contacts list 415, caller scoring module 420, user interface ("UI") modification module 425, call blocking module 430, and user feedback module 435. These components may be implemented via hardware circuitry, software logic, and/or a combination of hardware and/or software associated with user device 305. In some implementations, user device 305 may include additional, fewer, different, and/or differently arranged components. Furthermore, some, or all, of the functionality of one or more components may be performed by one or more other components.

Some or all of these components may be implemented at one or more layers of user device 305, such as at a hardware layer, a kernel layer, an operating system layer, and/or an application layer. For example, in some implementations, one or more of modules 405-415 may be installed in firmware (e.g., a ROM) of user device 305, while another one of modules 405-415 may be installed as an app, by an end-user or a vendor of user device 305. For example, in some implementations, UI modification module 425 may include, or communicate with other logical components of user device 305 via, an API. As mentioned above, the API may, in some implementations, be provided by a manufacturer and/or a vendor associated with user device 305.

Incoming call detection module 405 may detect incoming calls to user device 305. For example, incoming call detection module 405 may include, or be communicatively coupled with, a voice call or video call functionality of user device 305, in order to detect incoming calls. Incoming call detection module 405 may also detect the identity of a caller, from whom the incoming call is received. The identity may include a telephone number, an IP address, screen name, and/or some other identifier. For example, in the instance of a video call received via a video call application that uses proprietary and/or non-standard identifiers, incoming call detection module 405 may detect the proprietary and/or non-standard identifier of the caller. As another example, in the instance of a voice call, incoming call detection module 405 may detect a telephone number of the caller using caller identification ("ID") techniques.

Caller information lookup module 410 may communicate with caller information repository 310, in order to identify whether caller information repository 310 stores information associated with a caller. Generally speaking, this lookup may help determine whether information, on whether the caller is an unwanted caller, is available. The information, received from caller information repository 310, may indicate complaints against callers, and may include information such as: a quantity of complaints against callers, dates and/or times associated with complaints against callers (e.g., dates and/or times that complaints were received against callers; and/or dates and/or times at which callers from unwanted callers were received), phone numbers of unwanted callers, keywords and/or phrases associated with complaints (e.g., "scammer," "spammer," "do not call registry," or other words and/or phrases) that may have been left by other users when submitting complaints, and/or other types of information. In some implementations, caller information repository 310 may provide scores that indicate how likely a particular caller is to be an unwanted caller. For example, caller information repository 310 may use proprietary algorithms to generate such scores, and provide the scores to caller information lookup module 410. In some implementations, caller information lookup module 410 may be "hard coded" to communicate with caller information repository 310. For example, caller information lookup module 410 may store a Uniform Resource Locator ("URL"), a Uniform Resource Indicator ("URI"), an IP address, and/or other information, based on which caller information lookup module 410 can communicate with caller information repository 310.

Caller information lookup module 410 may also check contacts list 415, which may indicate that a caller is a trusted caller (and a lookup to caller information repository 310 may not be necessary). For example, if a caller's telephone number is included in contacts list 415, it may, in some implementations, be safe to assume that the caller is a trusted caller (e.g., a friend or family member of a user of user device 305). Contacts list 415 may include information regarding contacts associated with a user of user device 305. The information in contacts list 415 may have been provided by the user, and/or may be generated or retrieved in some sort of automated fashion (e.g., via an import of a user's social media profile). In some implementations, a manufacturer and/or vendor of user device 305 may provide an API, via which contacts list 415 can be accessed by caller information lookup module 410.

Caller scoring module 420 may determine a likelihood that a caller is an unwanted caller or not. For example, caller scoring module 420 may generate a score based on information received from caller information lookup module 410. The score may be based on, for example, a quantity of times the caller has been reported as an unwanted caller, a quantity of complaints against the caller, a score received from caller information repository 310, and/or one or more other factors. In some implementations, caller scoring module 420 may more heavily weigh more recent complaints/reports against the caller than older complaints/reports. For example, caller scoring module 420 may weigh recent complaints (e.g., within the past week, or another length of time) twice as heavily as older complaints (e.g., placed before the past week, or another length of time). In some implementations, certain complaints may be disregarded, if they were submitted at least a threshold amount of time ago (e.g., complaints that are at least a year old may be disregarded when generating the score). In other implementations, older complaints may be weighted more heavily than newer complaints.

In some implementations, the score may be based on the presence of keywords and/or phrases, associated with complaints. For example, if a particular complaint includes the words "scam," "spam," or the like, the score may be impacted in a manner that reflects that the caller may be an unwanted caller. In some implementations, different keywords and/or phrases may be weighted differently. For instance, the word "scam" may be weighted more heavily than the word "spam" (e.g., the presence of the word "scam" may be a stronger indication that a caller is an unwanted caller, than the presence of the word "spam").

In some implementations, caller scoring module 420 may examine a call log (or a past call history), in order to determine the score. For example, if user device 305 has placed outgoing calls to a particular phone number in the past, then it may be inferred that the particular phone number is not associated with an unwanted caller. Thus, in some implementations, when a call is received from that phone number, caller scoring module 420 may set the score to 0 (e.g., the minimum score, which may indicate that the caller is not an unwanted caller). In some implementations, caller scoring module 420 may set the score to 0, even if there are other indications that the caller may be an unwanted caller. For example, if there are several complaints against the caller, but user device 305 has placed outgoing calls to the caller, caller scoring module 420 may set the score to 0, and/or may reduce the score by virtue of user device 305 having placed outgoing calls to the caller.

As another example, incoming calls, that have been answered by user device 305, may be used by caller scoring module 420 to generate the score. For example, if user device 305 has answered calls from a particular number in the past, then caller scoring module 420 may use this information when generating a score for a caller that corresponds to the particular number. As another example, if user device 305 has declined calls (e.g., ended calls from a particular caller without answering them, allowed calls from a particular caller to go to voice mail, ended calls from a particular caller within a relatively short time (e.g., within one second, within five seconds, etc.), the quantity and/or proportion of declined calls (e.g., as opposed to answered calls, such as calls that have been answered by user device 305 and not ended within a threshold period of time) may be used in generating the score for the caller. As mentioned above, for instance, caller scoring module 420 may set the score to 0 and/or may modify the score, based on whether the user has previously answered calls from the particular number before.

In some implementations, a duration of previous calls (e.g., incoming and/or outgoing calls) from a particular phone number may be used by caller scoring module 420 to generate the score for a particular caller. For instance, if user device 305 has answered a call from a particular number, but the call was relatively short (e.g., less than 15 seconds), then it may be potentially inferred that the caller was an unwanted caller (e.g., the user may have quickly hung up, and/or may have asked that the caller not call again). On the other hand, if the call is relatively long (e.g., longer than 15 seconds), then it may potentially be inferred that the caller was not an unwanted caller, and the score for the caller may be reflected accordingly.

The information, regarding the call history of user device 305 (or a user of user device 305), may be provided by a call log (e.g., stored locally by user device 305) and/or from an external source (e.g., a wireless network provider associated with user device 305, and/or a service where such information is collected).

In some implementations, caller scoring module 420 may simply use a score, provided by caller information repository 310 (e.g., in implementations where a score is received from caller information repository 310). In other implementations, caller scoring module 420 may combine a score, received from caller information repository 310, with a score generated by caller scoring module 420. While examples of how caller scoring module 420 may generate a score are provided above, in practice, the score may be generated using one or more factors in addition to, or in lieu of, the examples provided above.

In some implementations, caller scoring module 420 may determine, based on the score, whether a particular caller is an unwanted caller. For example, if the score exceeds a threshold (e.g., above 50 on a 0-100 scale), then caller scoring module 420 may determine that the caller is an unwanted caller. As another example, different thresholds may be used for different levels of confidence that the caller is an unwanted caller. For example, if the score is 0, then caller scoring module 420 may determine that the caller is definitely not an unwanted caller; if the score is between 1 and 49 (inclusive), caller scoring module 420 may determine that the caller may potentially be an unwanted caller; and if the score is 50 or above, then the caller is definitely an unwanted caller. As described below, these different levels of confidence may affect the type of information presented on a call notification screen.

In some implementations, caller scoring module 420 may provide the generated score to caller information repository 310 (and/or to another device). Caller information repository 310 (or the other device) may receive scores from multiple user devices, and may maintain these scores in order to intelligently identify callers who may be unwanted callers. That is, caller information repository 310 may generate or modify scores, for potential unwanted callers, based on scores received from multiple user devices 305, and/or based on one or more other factors. In this manner, caller information repository 310 may, in some implementations, serve as a central knowledge repository, which may learn and refine information regarding potential unwanted callers based on feedback received from multiple user devices 305.

UI modification module 425 may generate and/or modify a UI, such as a call notification screen, based on scores and/or determinations made by caller scoring module 420. Some examples of UIs, which may be generated and/or modified by UI modification module 425, are described below with respect to FIG. 6. Generally, UI modification module 425 may provide an indication that a caller is an unwanted caller, and may potentially indicate a confidence that the caller is an unwanted caller. As mentioned above, UI modification module 425 may include and/or implement an API, via which other logical components of user device 305 (e.g., a component that generates or outputs a call notification screen) may be instructed to output a modified call notification screen.

Call blocking module 430 may, in some implementations, block calls from unwanted callers. For example, calls from unwanted callers, as determined by caller scoring module 420, may be blocked (or prevented). In some implementations, calls from callers with at least a certain threshold score (e.g., 75 or above, 100, or another value or range of values) may be blocked by call blocking module 430. Blocked calls may, in some implementations, not be shown to a user of user device 305. For instance, user device 305 may not ring when call blocking module 430 blocks a call, a call notification screen may not be displayed by user device 305, etc. In some implementations, when a call is blocked by call blocking module 430, a "missed call" notification may not be provided to the user of user device 305. In other implementations, a "missed call" notification may be provided to the user of user device 305 (e.g., in situations where the user may want to know which calls were blocked by call blocking module 430). In some such implementations, the "missed call" notification may indicate why the call was blocked by call blocking module 430 (e.g., may indicate that the caller was likely an unwanted caller).

As mentioned above, different score thresholds may apply, in some implementations. Therefore, in some such implementations, calls with scores meeting one threshold (e.g., between 1 and 49) may be indicated on a call notification screen (e.g., via UI modification module 425), while calls with scores meeting another threshold (e.g., 50 and above) may be blocked (e.g., by call blocking module 430). In some implementations, the user of user device 305 may configure these thresholds, and/or how the user would like to be notified.

User feedback module 435 may obtain feedback from the user of user device 305, either directly (e.g., by asking questions to the user) or passively (e.g., by monitoring the user's interactions with user device 305). For example, when UI modification module 425 generates or modifies a call notification screen, and/or when a call is blocked by call blocking module 430, the user may be asked whether the caller was an unwanted caller or not. This may be useful in situations where a caller was erroneously identified as an unwanted caller, and may serve to refine the determination (e.g., by user device 305, by other user devices 305, by caller information repository 310, etc.) of whether callers are unwanted callers. As mentioned above, for example, caller information repository 310 may receive the user feedback, and may refine its information on whether callers are unwanted callers (e.g., may modify one or more scores associated with potential unwanted callers).

As another example, user feedback module 435 may monitor user activity on user device 305, in order to identify activity from which inferences may be drawn as to whether a particular caller was an unwanted caller or not. For example, when a call is blocked by call blocking module 430 (and the call is reported to the user as having been blocked), user feedback module 435 may monitor whether the user calls the caller back or not. In situations where the user calls the blocked caller (e.g., shortly after the call was blocked), an inference may be made that the caller was not an unwanted caller.

As another example, the duration of a call, to a previously blocked number, may be used to infer whether the caller was an unwanted caller. For example, if the user calls a previously blocked caller, and the duration of the call is relatively short (e.g., 15 seconds or less), it may be inferred that the caller was an unwanted caller (e.g., the user may have called the caller asking him or her not to call again). On the other hand, the duration of the call is not relatively short (e.g., longer than 15 seconds), it may be inferred that the caller was not an unwanted caller (e.g., the user may have called the caller in order to have a bona fide conversation). Further examples of using user feedback are discussed below with respect to FIGS. 8 and 9.

Figure 5:
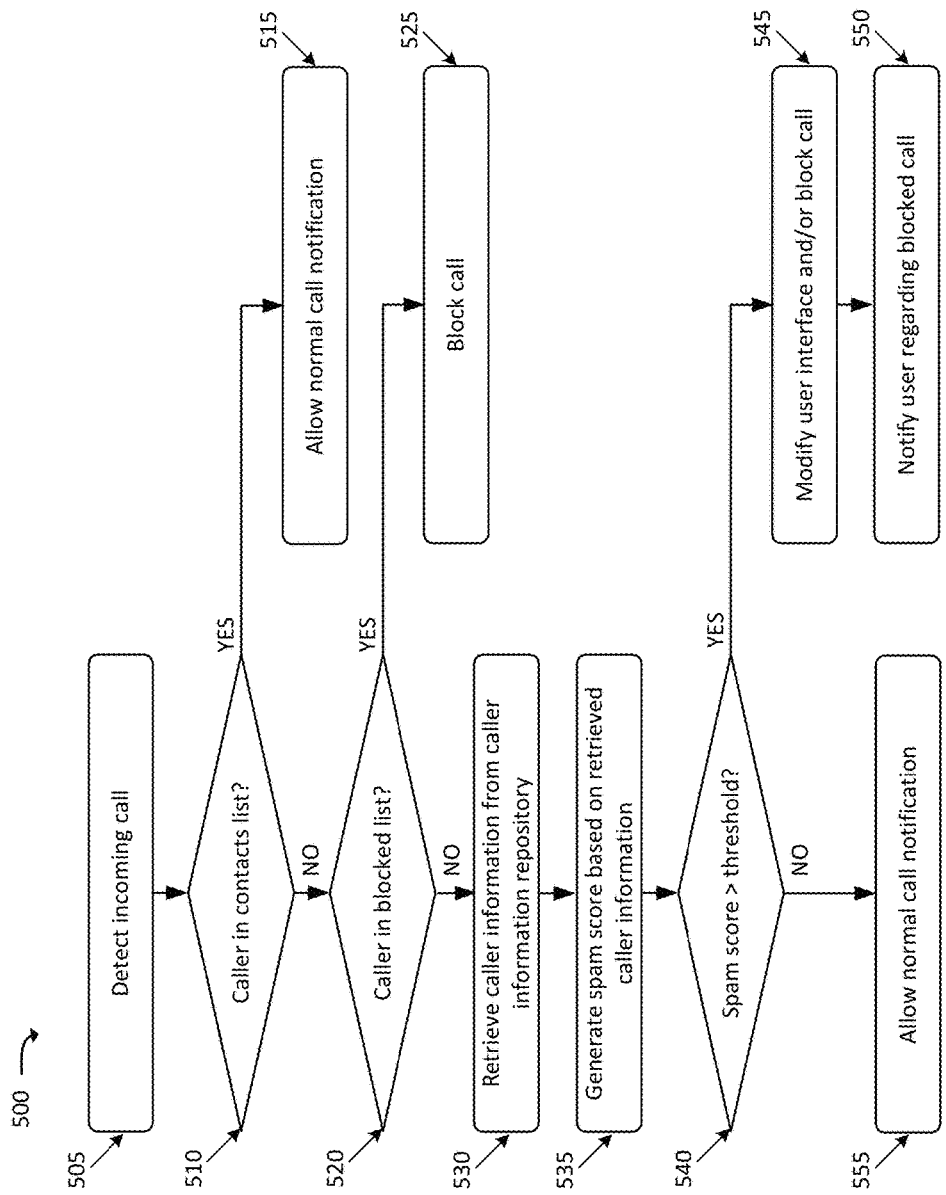
FIG. 5 illustrates an example process for presenting a modified or enhanced user interface based on an incoming call being associated with a potential unwanted caller.

FIG. 5 illustrates a flowchart of an example process 500, in accordance with some implementations. In some implementations, process 500 may be performed by user device 305 (e.g., by one or more of the components described above with respect to FIG. 4). In other implementations, process 500 may be performed by one or more other devices in addition to, or in lieu of, user device 305.

As shown, process 500 may include detecting (at 505) an incoming call. For example, as described above with respect to incoming call detection module 405, user device 305 may detect an incoming call, and may identify a phone number associated with the incoming call.

Process 500 may also include determining (at 510) if the caller is in a contact list of user device 305. For example, as described above with respect to caller information lookup module 410, user device 305 may determine whether the call is in contacts list 415 of user device 305.

If the caller is in the contacts list (510—YES), then process 500 may include allowing (at 515) a normal call notification. For example, user device 305 may allow the call notification (e.g., a ring, a call notification screen, etc.) as normal, without any indication that the caller may be an unwanted caller. In some implementations, user device 305 may display an indication that the caller is not an unwanted caller (e.g., may display a check mark, or may include words such as "not spam," etc.).

If, on the other hand, the caller is not in the contacts list (510—NO), then process 500 may include determining (at 520) whether the caller is in a blocked list. For example, user device 305 may determine whether a user of user device 305 has previously blocked the caller. User device 305 may, for instance, maintain a list of phone numbers that have been blocked by the caller, or have otherwise been indicated by the caller as being callers from whom calls should be blocked.

If the caller is in the blocked list (520—YES), then process 500 may include blocking (at 525) the call. As mentioned above, when blocking a call, user device 305 may indicate to the user that the call was blocked. In other implementations, when blocking a call, user device 305 may prevent any notification from being provided to the user at all. In this manner, the user may not be notified of, or disturbed by, calls from callers whom the user has already identified as being unwanted.

If, on the other hand, the caller is not in the blocked list (520—NO), then process 500 may include retrieving (at 530) caller information from a caller information repository. For example, as described above with respect to caller information lookup module 410, user device 305 may retrieve the caller information from caller information repository 310 and/or another source. For instance, user device 305 may query caller information repository 310 with the phone number of the caller, and may receive information from caller information repository 310 regarding the phone number.

Process 500 may further include generating (at 535) a spam score based on the retrieved caller information. For example, as described in greater detail above with respect to caller scoring module 420, user device 305 may generate a spam score based on a quantity of complaints associated with the caller, an age of the complaints, keywords associated with the complaints, etc. In some situations, caller information repository 310 may not return information about the caller (e.g., if caller information repository 310 does not have any information on the caller, which may be the situation when the caller is not an unwanted caller). In these situations, the score may reflect that the caller is likely not an unwanted caller (e.g., a spam score of 0).

Process 500 may additionally include determining (at 540) whether the spam score exceeds a threshold score. As mentioned above, there may be one or more thresholds, against which user device 305 may compare the spam score. The meeting or exceeding of different thresholds may warrant different (or additional) action.

If the spam score exceeds the threshold score (540—YES), then process 500 may include modifying (at 545) a user interface and/or blocking the call. For instance, as described above with respect to UI modification module 425 and/or call blocking module 430, user device 305 may notify the user that the call is likely an unwanted call, and/or may block the call entirely. As mentioned above, the meeting or exceeding of a first threshold (but not a second threshold) may cause user device 305 to provide the notification (e.g., modify a call notification screen and/or otherwise modify a call notification), while the meeting or exceeding of a second threshold (e.g., a threshold that is higher than the first threshold) may cause user device 305 to block the call.

Process 500 may further include notifying (at 550) a user of user device 305 regarding the blocked call. For example, in some implementations, when the call is blocked, user device 305 may notify the user that the call has been blocked. As also mentioned above, user device 305 may request user feedback regarding the blocked call, and/or may track subsequent user activity in order to refine the determination of how to score potentially unwanted callers.

If, on the other hand, the spam score does not exceed the threshold (540—NO), then process 500 may include allowing (at 555) a normal call notification (e.g., as similarly described above with respect to 515). In some implementations, user device 305 may request user feedback regarding the call (allowed at 555), in order to refine the determination of how to score potentially unwanted callers. For example, if the call was allowed, and the caller was in fact an unwanted caller, the user may indicate that the caller was an unwanted caller, and caller scoring module 420 (and other user devices 305 and/or caller information repository 310) may use the information when subsequently scoring calls from the same caller. For instance, if the same caller calls again, user device 305 may not allow the call again, but instead may identify the call as an unwanted call, and may block the call and/or modify the call notification to indicate that the caller is an unwanted caller.

Figure 6:
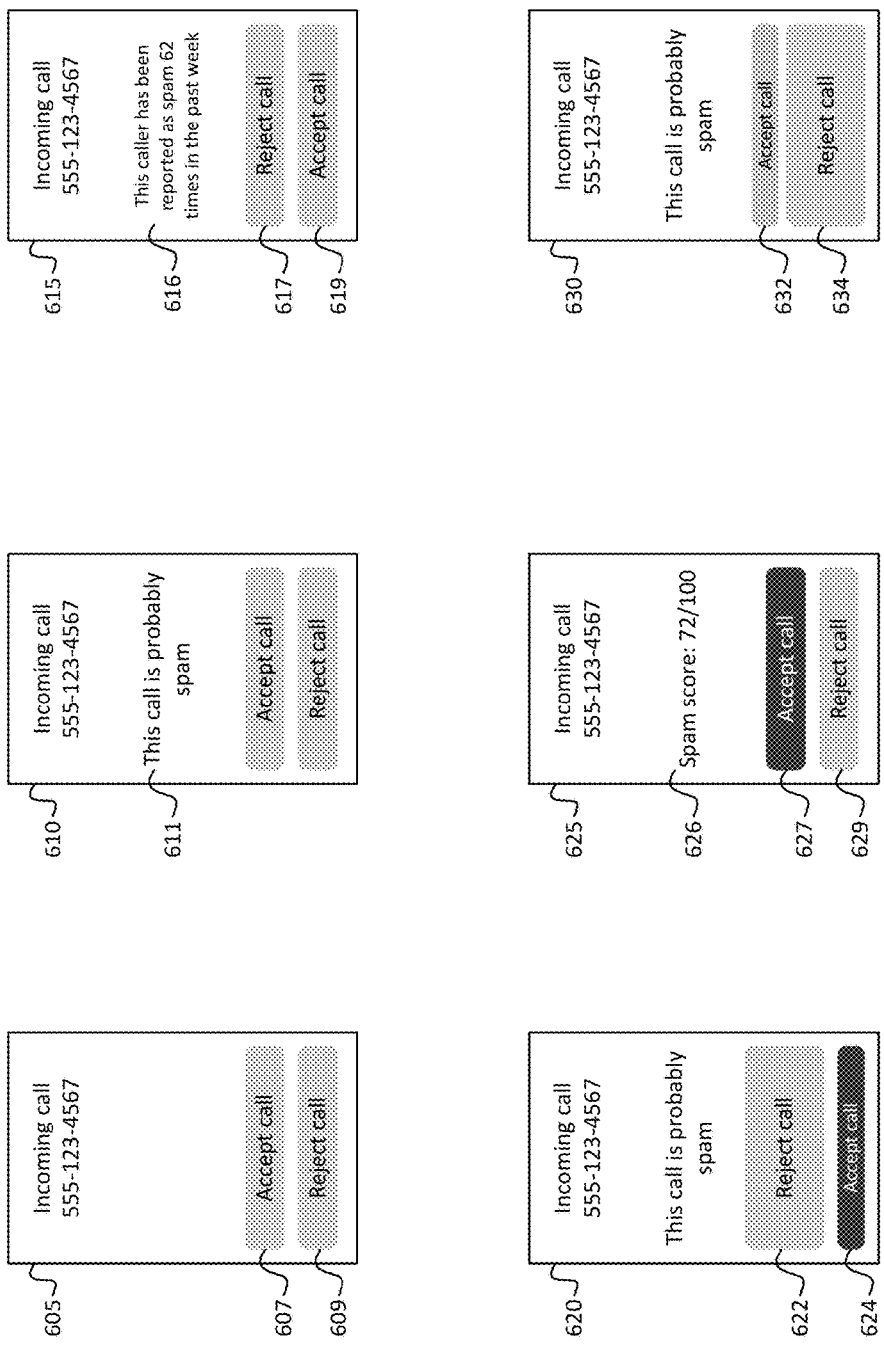
FIG. 6 illustrates example modified or enhanced user interfaces based on an incoming call being associated with a potential unwanted caller.

FIG. 6 illustrates example UIs, which may correspond to call notification screens, in accordance with some implementations. For example, UI 605 may be a call notification screen for a call that has been allowed to go through normally. As shown, the phone number (555-123-4567) of the caller may be displayed, along with "Accept call" button 607 and "Reject call" button 609. UI 605 may be presented, for example, when a caller is in a callee's contact list, when the caller has been determined (by, for example, caller scoring module 420) not to be an unwanted caller, or even in a conventional user device that does not evaluate incoming calls as being from unwanted callers.

UI 610 corresponds to a call notification screen that includes indication 611 ("This call is probably spam") that an incoming call may be from an unwanted caller. Indication 611 may be presented when, for example, caller scoring module 420 has determined that a spam score, for the caller, exceeds a threshold. In some implementations, the spam score may exceed a first threshold, but may not exceed a second threshold (i.e., may be in between the thresholds).

UI 615 corresponds to a call notification screen that includes indication 616 ("This caller has been reported as spam 62 times in the past week"). The information included in indication 616 may have been received from, for example, caller information repository 310. In some implementations, the more detailed indication 616 may be provided based on a user preference (e.g., the user may have selected an option to received detailed indications regarding potentially unwanted callers). As also shown, UI 615 may include one or more other modifications. For instance, the position of "Reject call" button 617 and "Accept call" button 619 may be switched, with respect to a normal position of these buttons (e.g., when the caller is not an unwanted caller, as shown in, for instance, UI 605). In some implementations, buttons 617 and 619 may be switched based on the spam score exceeding a particular threshold (e.g., a separate threshold relating to whether buttons 617 and 619 should be switched.

UI 620 corresponds to a call notification screen that includes further modified "Reject call" and "Accept call" buttons 622 and 624, respectively. For instance, as shown, "Reject call" button 622 may be enlarged (in addition to being switched with a normal position of "Accept call" button 624). Further, "Accept call" button 624 may, in some implementations, be reduced in size. As further shown, the coloring (or shading) of "Accept call" button 624 may be modified, in order to make "Accept call" button 624 appear less prominent, and/or to highlight the fact that the call may be from an unwanted caller. While not shown, in some implementations, the coloring and/or shading of "Reject call" button 622 may additionally, or alternatively, be modified (e.g., to make "Reject call" button 622 appear more prominent).

UI 625 corresponds to a call notification screen that includes indication 626 ("Spam score: 72/100"). Indication 626 may provide the user with further insight into how likely the caller is to being an unwanted caller, by providing the raw spam score (or a normalized spam score), which may have been generated by caller scoring module 420 and/or received from caller information repository 310. As further shown, UI 625 may include "Accept call" button 627 and "Reject call" button 629 in their normal positions and sizes, but with modified shading (e.g., to highlight the fact, to the user, that the call is likely from an unwanted caller). In some implementations, the shading may vary with the spam score. For instance, if the spam score is a maximum spam score, the button may be bright red; if the spam score is a minimum spam score, the button may be bright green; and if the spam score is in between, the button may be a shade in between bright red and bright green, and may vary based on the spam score (e.g., if the spam score is 25, the button may be a mixture of 75% bright green and 25% bright red, etc.).

UI 630 corresponds to a call notification screen that includes "Accept call" button 632 and "Reject call" button 634 in their normal positions, but with different sizes. For example, "Accept call" button 632 may be diminished in size, and/or "Reject call" button 634 may be increased in size. While not shown, the colors and/or shading of these buttons may be modified as well.

While some of the examples described above include multiple concepts (e.g., combinations of modified positions of buttons, indications regarding unwanted callers, modified coloring and/or shading of buttons, etc.), in practice, these concepts may be used in different combinations or arrangements. For instance, while UI 625 includes indication 626, of a spam score and of "Accept call" button 627 with modified coloring and/or shading, in some implementations, a call notification screen may include indication 626, but an "Accept call" button without modified coloring and/or shading.

Furthermore, while visual UI modifications are described above, in some implementations, other notifications regarding incoming calls may be modified in addition to, or in lieu of, the visual modifications described above. For example, when an unwanted call is received, a ring tone of user device 305 may be muted or silenced, may be played with a decreased volume (relative to if the call is not an unwanted call), or a different ring tone may be played than a standard ring tone associated with user device 305 (e.g., a ringtone that is played for calls that are not unwanted calls). As another example, when an unwanted call is received, user device 305 may provide haptic feedback (e.g., may vibrate). In some implementations, when an unwanted call is received, user device 305 may not vibrate (e.g., when user device 305 ordinarily vibrates when a call is received). As yet another example, when an unwanted call is received, user device 305 may vibrate in a different manner than a vibration when the call is not unwanted (e.g., may vibrate with a different pattern and/or may vibrate less intensely).

Figure 7:
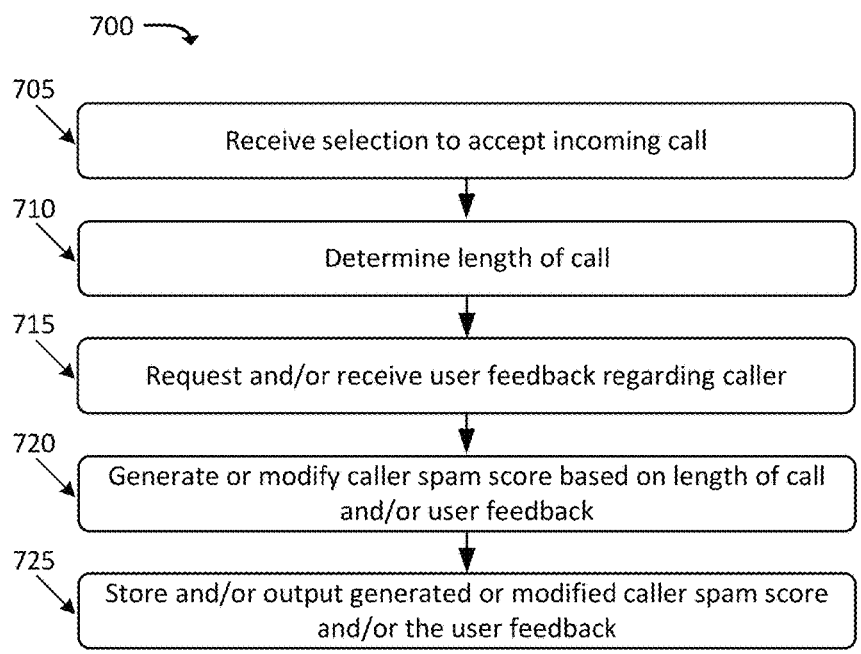
FIG. 7 illustrates an example process for intelligently refining information that may be used to determine whether a caller is an unwanted caller.

FIG. 7 illustrates a flowchart of an example process 700, for refining spam scores. In some implementations, process 700 may be performed by user device 305 (e.g., by one or more of the components shown in FIG. 4). In other implementations, some or all of process 700 may be performed by one or more devices in addition to, or in lieu of, user device 305. Process 700 may be performed when, for example, a call is incoming for user device 305. In some implementations, process 700 may only be performed when the caller has been identified as an unwanted caller (or as a potentially unwanted caller). In some implementations, process 700 may only be performed when the caller has not been identified as an unwanted caller. In some implementations, process 700 may be performed regardless of whether the caller has been identified as an unwanted caller or not.

As shown, process 700 may include receiving (at 705) a selection to accept an incoming call. For example, a user of user device 305 may have selected to accept the incoming call (e.g., has pressed an "Accept call" button in a call notification interface).

Process 700 may also include determining (at 710) a length of the call. For example, user feedback module 435 may determine (or receive information from another component of user device 305) a length (or duration) of the call, once the call has been completed.

Figure 8:
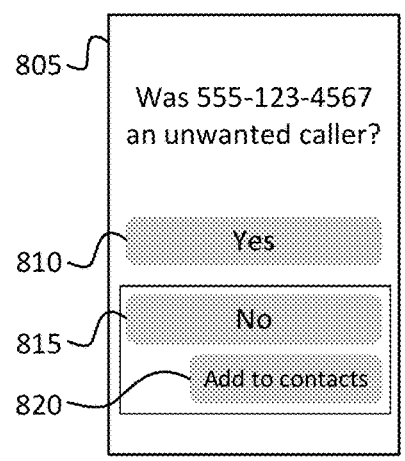
FIGS. 8 and 9 illustrate example user interfaces for obtaining user feedback information regarding an incoming call.

Process 700 may further include requesting (at 715) and/or receiving user feedback regarding the caller. For example, as shown in FIG. 8, user device 305 may present UI 805, which may request that the user provide feedback regarding the caller ("Was 555-123-4567 an unwanted caller?"). UI 805 may include "Yes" button 810, "No" button 815, and "Add to contacts" button 820. The user may select "Yes" button 810 if the user believes that the caller was an unwanted caller, and may select "No" button 815 if the user does not believe that the caller was an unwanted caller. Further, the user may select "Add to contacts" button 820 if the user desires to add the caller to the user's contacts list. In some implementations, "Add to contacts" button 820 may be presented after "No" button 815 is selected, while in some implementations, "Add to contacts" button 820 may be presented concurrently with "No" button 815 and/or with "Yes" button 810.

Process 700 may additionally include generating (at 720) and/or modifying a caller spam score based on the length of the call and/or the user feedback. For example, as mentioned above, the spam score for the caller may be generated or modified based on whether the user indicated that the caller was spam or not (e.g., may be reduced or changed to 0 if the caller indicates that the caller is not an unwanted caller, or may be increased or left alone if the call was identified as unwanted by caller scoring module 420, and confirmed by the user as unwanted). As another example, and as also mentioned above, the spam score for the caller may be generated or modified based on how long the user spent on the call (e.g., a shorter call may be indicative of an unwanted call).

In some implementations, one or more other factors may be used to generate and/or modify a spam score. For instance, if the call was originally presented as an unwanted caller, and the user subsequently indicates that the caller is not an unwanted caller, this may swing the spam score more heavily than if the call was originally presented as an unwanted caller, and the user confirms that the caller is an unwanted caller. As another example, if the call was not originally presented as an unwanted caller, and the user subsequently indicates that the caller is an unwanted caller, this may swing the spam score more heavily than if the call was originally presented as an unwanted caller, and the user confirms that the caller is an unwanted caller.

Process 700 may also include storing (at 725) and/or outputting the generated or modified spam score and/or the user feedback. For example, user device 305 may store the spam score generated or modified at 720, and/or may output the spam score to caller information repository 310 (or another device). User device 305 may additionally, or alternatively, provide information regarding the user feedback to caller information repository 310, which may assist caller information repository 310 in refining a spam score for the caller.

Figure 9:
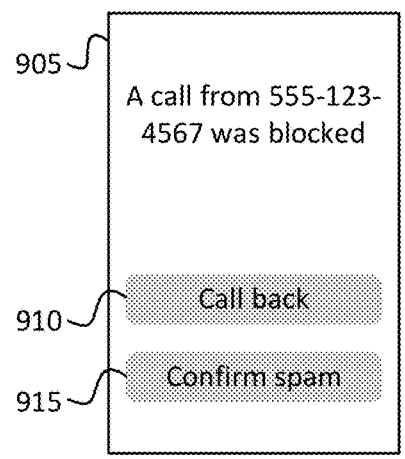

FIG. 9 illustrates UI 905, which may also be used to collect user feedback. UI 905 may be presented, for example, when a call has been blocked (e.g., by call blocking module 430). "Call back" button 910 may allow the user to call back the number that was blocked, and "Confirm spam" button 915 may be used (e.g., by caller scoring module 420) to refine a spam score associated with the caller. For example, if the user selects "Confirm spam" button 915, caller scoring module 420 may increase the spam score associated with the caller. In some implementations, as mentioned above, information regarding the user feedback (e.g., the selection of either button 910 or 915) may be provided to caller information repository 310, in order to further refine the spam score associated with the caller.

Figure 10:
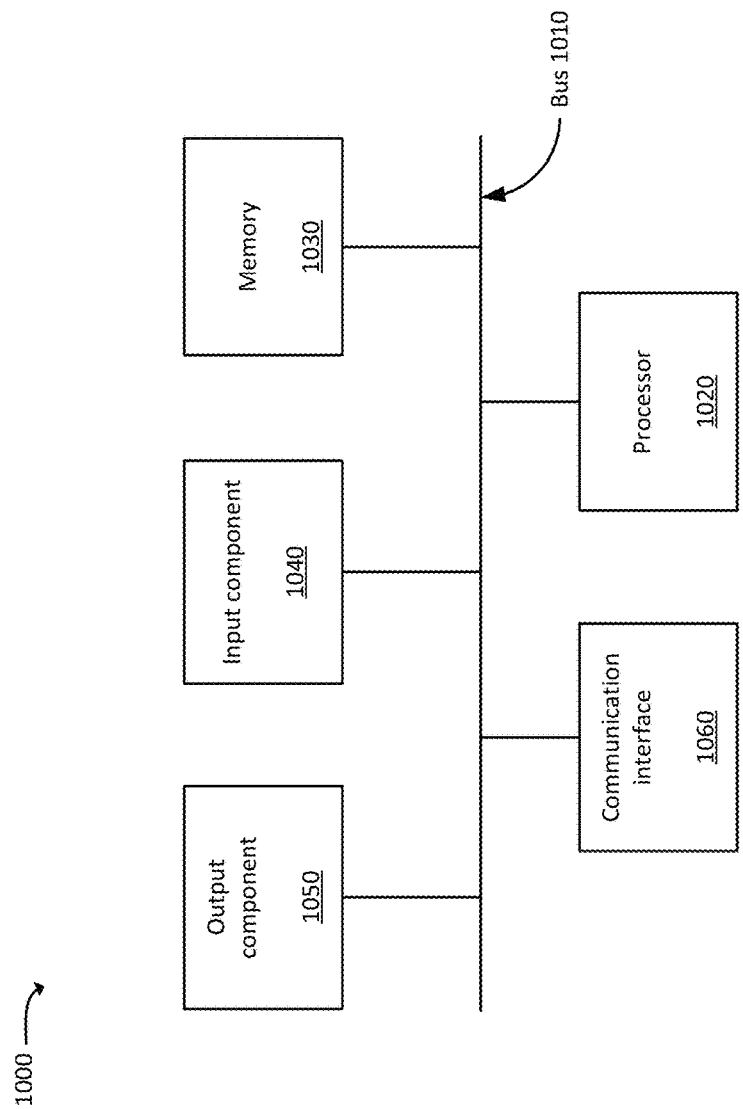
FIG. 10 illustrates example components of a device, in accordance with some implementations described herein.

FIG. 10 is a diagram of example components of device 1000. One or more of the devices described above may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as one or more cellular radio transceivers, a Wi-Fi radio transceiver (e.g., which operates on an IEEE 802.11-based standard), an infrared ("IR") receiver and/or emitter, a Bluetooth radio, a Near Field Communications ("NFC") device, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described with regard to FIGS. 5 and 7, the order of the blocks and/or signals may be modified in other implementations. Further, non-dependent blocks and/or signals may be performed in parallel.

Furthermore, while implementations are described above regarding identifying unwanted callers, similar techniques may be used to identify trusted callers. For example, a legitimate credit card company may call a user, but the user may not recognize the number. External repositories (e.g., caller information repository 310) may store information (e.g., feedback from other users, a score, etc.) that may identify the caller as a "trusted" caller, and/or may provide a name of the caller. Similar techniques may be used as described above (e.g., a modified UI, showing that the caller is "trusted," an enhanced "Accept call" button, etc.) to indicate to the user that the caller is a trusted caller, even if the user does not necessarily recognize the number.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations are described herein in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used. In some situations, the terms "exceed," "exceeding," etc., a threshold may be exclusive terms (e.g., above or below the threshold, but not equaling the threshold). In other situations, the terms "exceed," "exceeding," etc., a threshold may be inclusive terms (e.g., above or below the threshold, or equaling the threshold).

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A user device, comprising:
   a memory device storing a set of processor-executable instructions; and a processor configured to execute the processor-executable instructions, wherein executing the processor-executable instructions causes the user device to:
- detect an incoming call for the user device;
- receive, from a caller information repository, information regarding a caller associated with the incoming call;
- generate, based on the information regarding the caller, a spam score;
- allow the call when the spam score does not exceed a threshold, the allowing including providing a call notification regarding the call;
- automatically reject the call when the spam score meets or exceeds the threshold, without playing a ringtone at the user device, vibrating the user device, or answering the call;
- present, after the call was rejected, a notification that the call was rejected, the notification including at least a first user-selectable graphical element and a second user-selectable graphical element, wherein selection of the first user-selectable graphical element indicates that the caller was an unwanted caller, wherein selection of the second user-selectable graphical element indicates that the caller was not an unwanted caller;
- receive, via either the first user-selectable graphical element or second user-selectable graphical element, user feedback regarding whether the caller, whose call was rejected, was an unwanted caller; and
- output information regarding the received user feedback to a device that refines the spam score, for the caller, based on the user feedback, wherein the refined spam score is used by another user device to determine whether to allow or block a subsequent call, made by the caller to the other user device.

2. The user device of claim 1, wherein the incoming call is a first call, wherein the caller is a first caller, wherein executing the processor-executable instructions further causes the processor to:
- detect a second incoming call for the user device;
- receive, from the caller information repository, information regarding a second caller associated with the second incoming call;
- determine, based on the received information, whether the second caller is an unwanted caller;
- when determining that the second caller is not an unwanted caller, present a first call notification that includes:
  - a first button having a first size, and
  - a second button having a second size,
  - the first button causing the call to be answered by the user device and the second button causing the call to be rejected, and
- when determining that the second caller is an unwanted caller, present a second call notification that includes at least one of:
  - the first button having a third size that is different from the first size, or
  - the second button having a fourth size that is different from the second size.

3. The user device of claim 2, wherein the second call notification indicates a measure of likelihood that the second caller is an unwanted caller.

4. The user device of claim 3, wherein the measure of likelihood, that the second caller is an unwanted caller, is represented by a numerical score.

5. The user device of claim 2, wherein the first call notification includes the first button and the second button in a first arrangement, and
wherein the second call notification includes the first button and the second button in a second arrangement that is different from the first arrangement.

6. The user device of claim 2, wherein the first call notification includes:
- the first button being shaded with a first color, and
- the second button being shaded with a second color, and
wherein the second call notification includes at least one of:
  - the first button being shaded with a third color that is different from the first color, or
  - the second button being shaded with a fourth color that is different from the second color.

7. The user device of claim 2, wherein the second call notification includes an indication of how often the second caller has been reported as an unwanted caller by other users.

8. The user device of claim 1, wherein the information, regarding the caller, includes a quantity of times that the caller has been reported as an unwanted caller,
wherein the spam score is based on the quantity of times that the caller has been reported as an unwanted caller.

9. The user device of claim 8, wherein the information, regarding the caller, further includes dates or times corresponding to reports that the caller has been reported as an unwanted caller,
wherein the spam score is further based on the dates or times corresponding to the reports that the caller has been reported as an unwanted caller.

10. The user device of claim 9, wherein older reports are weighted less heavily than newer reports.

11. The user device of claim 2, wherein executing the processor-executable instructions further causes the user device to:
- monitor user activity after the second call has been allowed; and
- output information, indicating the monitored user activity, to the device that refines a spam score, associated with the second caller, based on the user activity.

12. The user device of claim 11, wherein the user activity, based on which the spam score, associated with the second caller, is refined, includes at least one of:
- whether the call was rejected by the user,
- an indication, via manual feedback, that the second caller is an unwanted caller, or
- an indication, via manual feedback, that the second caller is not an unwanted caller.

13. The user device of claim 2, wherein presenting the first call notification includes playing the first ringtone at the user device, and
wherein presenting the second call notification includes vibrating the user device in lieu of playing the ringtone, based on the determination that the second caller is an unwanted caller.

14. The user device of claim 1, wherein the caller information repository is an external device that receives information, regarding a plurality of callers, from a plurality of user devices.

15. The user device of claim 1, wherein the user device has not ever been called by the caller prior to the call being received, wherein the spam score meets or exceeds the threshold, and the call is rejected based on the spam score not meeting or exceeding the threshold.

16. The user device of claim 1, wherein executing the processor-executable instructions further causes the user device to:
   attempt to locate the caller in a contact list associated with the user device;
   determine, based on the attempting, that the caller is not in a contact list associated with the user device; and
   request, from the caller information repository and based on determining that the caller is not in the contact list associated with the user device, the information regarding the caller.

17. A user device, comprising:
   a memory device storing a set of processor-executable instructions; and
   a processor configured to execute the processor-executable instructions, wherein executing the processor-executable instructions causes the user device to:
   detect an incoming call for the user device;
   receive, from a caller information repository, information regarding a caller associated with the incoming call;
   generate, based on the information regarding the caller, a spam score;
   allow the call when the spam score does not exceed a threshold, the allowing including providing a call notification regarding the call;
   block the call when the spam score meets or exceeds the threshold, the blocking including automatically rejecting the call without playing a ringtone at the user device, vibrating the user device, or answering the call;
   present, after the call was rejected, a notification that the call was rejected, the notification including one or more user-selectable graphical elements;
   receive, via the one or more user-selectable graphical elements, user feedback regarding whether the caller, whose call was rejected, was an unwanted caller; and
   output information regarding the received user feedback to a device that refines the spam score, for the caller, based on the user feedback, wherein the refined spam score is used by another user device to determine whether to allow or block a subsequent call, made by the caller to the other user device.

18. The user device of claim 17, wherein when the call is blocked, a missed call notification is not provided.

19. A non-transitory computer-readable medium storing a set of processor-executable instructions, which, when executed by one or more processors of a user device, cause the user device to:
   detect an incoming call for the user device;
   receive, from a caller information repository, information regarding a caller that placed the incoming call;
   generate, based on the information regarding the caller, a spam score;
   compare the spam score to a threshold;
   determine, based on the comparing, that the spam score for the caller meets or exceeds the threshold;
   based on determining that the spam score for the caller meets or exceeds the threshold, automatically reject the call without playing a ringtone at the user device, vibrating the user device, or answering the call;
   present, after the call was rejected, a notification that the call was rejected, the notification including one or more user-selectable graphical elements, selection of which indicates whether the caller was an unwanted caller;
   receive, via the one or more user-selectable graphical elements, user feedback regarding whether the caller, whose call was rejected, was an unwanted caller; and
   output information regarding the received user feedback to a device that refines the spam score, for the caller, based on the user feedback, wherein the refined spam score is used by another user device to determine whether to allow or reject a subsequent call, made by the caller to the other user device.

20. The non-transitory computer-readable medium of claim 19, wherein the automatic rejecting of the call is further performed without receiving a user interaction indicating that the call should be rejected.

* * * * *